(12) United States Patent
Iglewski (10) Patent No.: US 12,276,227 B1
(45) Date of Patent: Apr. 15, 2025

(54) TURBINE ENGINE SCREEN

(71) Applicant: General Electric Company Polska sp. z o.o., Warsaw (PL)

(72) Inventor: Tomasz Iglewski, Warsaw (PL)

(73) Assignees: General Electric Company, Evendale, OH (US); General Electric Company Polska sp. z o.o., Warsaw (PL)

( * ) Notice: Subject to any disclaimer, the term of this patent is extended or adjusted under 35 U.S.C. 154(b) by 0 days.

(21) Appl. No.: 18/592,663

(22) Filed: Mar. 1, 2024

(30) Foreign Application Priority Data

Oct. 23, 2023 (PL) .......................................... 446463

(51) Int. Cl.
*F02C 7/055* (2006.01)
*F02C 7/04* (2006.01)

(52) U.S. Cl.
CPC ................ *F02C 7/055* (2013.01); *F02C 7/04* (2013.01)

(58) Field of Classification Search
CPC .... F02C 7/04; F02C 7/042; F02C 7/05; F02C 7/055; F02C 7/057; B64D 2033/022; B64D 33/02; B01D 29/00; B01D 2029/033; B01D 45/00; B07B 1/4636
See application file for complete search history.

(56) References Cited

U.S. PATENT DOCUMENTS

| | | | |
|---|---|---|---|
| 1,177,320 A | 3/1916 | Grabowsky | |
| 2,046,458 A | 7/1936 | Johnson | |
| 2,392,223 A | 1/1946 | Brickman | |
| 2,618,358 A | 11/1952 | Newcomb | |
| 2,663,993 A | 12/1953 | Mosser | |
| 2,747,685 A | 5/1956 | Foley | |
| 2,893,560 A * | 7/1959 | Bixby | B07B 1/4636 |
| | | | 209/394 |
| 2,928,497 A * | 3/1960 | Stockdale | F02C 7/055 |
| | | | 55/306 |
| 3,426,981 A | 2/1969 | Allcock | |
| 3,428,278 A | 2/1969 | Glaze | |
| 3,526,953 A | 9/1970 | Levinstein | |
| 3,589,694 A | 6/1971 | Gelling et al. | |
| 3,667,108 A | 6/1972 | Schmidt | |
| 3,833,695 A | 9/1974 | Vidal | |

(Continued)

FOREIGN PATENT DOCUMENTS

| | | |
|---|---|---|
| FR | 2603946 A1 * | 3/1988 |
| GB | 757724 A | 9/1956 |

(Continued)

*Primary Examiner* — Todd E Manahan
*Assistant Examiner* — Sean V Meiller
(74) *Attorney, Agent, or Firm* — Dority & Manning, P.A.

(57) ABSTRACT

A screen for an aeronautical gas turbine engine includes a plurality of first filaments and a plurality of second filaments. The plurality of second filaments define a plurality of openings with the plurality of first filaments. The plurality of first filaments and the plurality of second filaments define a first arrangement in which the plurality of first filaments are perpendicular to the plurality of second filaments. Upon application of a force to the screen, at least some of the plurality of first filaments and at least some of the plurality of second filaments are configured to translate from the first arrangement to a second arrangement in which a size of at least one of the openings is configured to change from a first size to a second size.

20 Claims, 4 Drawing Sheets

(56) References Cited

U.S. PATENT DOCUMENTS

| | | | |
|---|---|---|---|
| 3,908,683 A | 9/1975 | Demetrick | |
| 4,726,183 A | 2/1988 | Gongwer | |
| 4,821,520 A * | 4/1989 | Rumfield | F02B 37/02 |
| | | | 55/525 |
| 6,886,249 B2 | 5/2005 | Smalc | |
| 8,756,909 B2 | 6/2014 | Avery | |
| 8,936,508 B2 | 1/2015 | Ameyugo | |
| 9,249,727 B2 * | 2/2016 | Matos | F02C 7/055 |
| 9,737,916 B2 * | 8/2017 | Schneider | B08B 7/02 |
| 9,873,522 B2 | 1/2018 | Snyder et al. | |
| 10,273,881 B2 * | 4/2019 | Dornier | B64D 33/02 |
| 10,364,746 B2 | 7/2019 | Srinivasan et al. | |
| 10,450,954 B2 | 10/2019 | Grissino et al. | |
| 11,084,599 B2 | 8/2021 | Iglewski et al. | |
| 2008/0098891 A1 | 5/2008 | Feher et al. | |
| 2009/0294113 A1 | 12/2009 | Cha et al. | |
| 2009/0321056 A1 | 12/2009 | Ran et al. | |
| 2010/0170667 A1 | 7/2010 | Bertolotti et al. | |
| 2010/0263847 A1 | 10/2010 | Alahyari et al. | |
| 2010/0313542 A1 | 12/2010 | Bansa et al. | |
| 2010/0326040 A1 | 12/2010 | Alfred | |
| 2011/0016845 A1 | 1/2011 | Silva et al. | |
| 2014/0268604 A1 | 9/2014 | Wicker et al. | |
| 2015/0176491 A1 | 6/2015 | Alnafisah | |
| 2016/0017804 A1 | 1/2016 | Afrianto et al. | |
| 2016/0089754 A1 | 3/2016 | Luo et al. | |
| 2016/0090842 A1 | 3/2016 | Luo et al. | |
| 2016/0207720 A1 | 7/2016 | Hanisch et al. | |
| 2017/0101970 A1 | 4/2017 | Zhang et al. | |
| 2017/0297733 A1 | 10/2017 | Zhao et al. | |
| 2018/0149084 A1 | 5/2018 | Duge | |
| 2019/0048798 A1 | 2/2019 | Slawinska et al. | |
| 2022/0194617 A1 | 6/2022 | Iglewski | |

FOREIGN PATENT DOCUMENTS

| | | |
|---|---|---|
| GB | 1201096 A | 8/1970 |
| GB | 1474390 A | 5/1977 |
| RU | 974718 A1 * | 6/1998 |

* cited by examiner

TURBINE ENGINE SCREEN

CROSS-REFERENCE TO RELATED APPLICATIONS

The present application claims priority to Polish Patent Application Serial Number P.446463 filed on Oct. 23, 2023.

FIELD

The present disclosure relates to aeronautical gas turbine engines and structures for adjusting airflow.

BACKGROUND

Inlet screens for the prevention of foreign object debris ("FOD") provide protection from potential damage and blockages that can be caused by FOD and ice. Conventional screens cause drag as air passes through the screen, affecting the efficiency of the engine. There exists a need for an inlet screen that addresses these challenges.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The word "askew" means "at an angle other than 0 or 90 degrees," such that two elements are "askew" if they define an angle between them that is not a right angle or if they are not parallel or collinear.

The word "arrangement" means "a pattern" or "a specified positioning of elements" within an object.

Ordinal terms such as "first," "second," and "third" are merely descriptive and do not indicate importance, order, or priority.

The present disclosure is generally related to an inlet screen for an aeronautical gas turbine engine. Because conventional inlet screens need to address FOD protection and still allow air to pass therethrough, designing a screen that provides both benefits may improve operation of the engine within space constraints in the engine.

To address these challenges, a screen for an aeronautical gas turbine engine includes a plurality of first filaments and a plurality of second filaments. Each of the first filaments are arranged in a lateral direction and arranged parallel to the others of the first filaments. Each of the second filaments are arranged in a longitudinal direction and arranged parallel to the others of the second filaments. The plurality of second filaments define a plurality of openings with the plurality of first filaments. The plurality of first filaments and the plurality of second filaments define a first arrangement in which the plurality of first filaments are perpendicular to the plurality of second filaments. Upon application of a force to the screen, at least some of the plurality of first filaments and at least some of the plurality of second filaments are configured to translate from the first arrangement to a second arrangement in which a size of at least one of the openings is configured to change from a first size to a second size.

Because the first and second filaments are slidable past each other to the second arrangement, the openings defined by the first and second filaments are adjustable to, e.g., provide the specific air flow for the engine. The force applied to the screen may use fewer mechanical components than conventional air flow regulators, reducing total weight and space used in the engine. Moreover, the screen formed by the first and second filaments provides FOD protection and may be controlled to remove debris and ice buildup.

Additionally, it will be appreciated that a risk of FOD ingestion by a gas turbine engine, such as a turboprop engine, may vary at different operating conditions. For example, at takeoff, a risk of FOD ingestion may be higher than at cruise. Notably, the inlet screen may be positioned over the inlet to the turboprop engine to reduce a risk of FOD ingestion. If designed to prevent FOD ingestion at takeoff, the screen may create unnecessary resistance for an inlet airflow during cruise. The present disclosure provides for an inlet screen that may vary an opening size, e.g., during different operations to reduce a resistance for the inlet airflow during operating conditions with less risk of FOD ingestion.

Figures 1A, 1B:
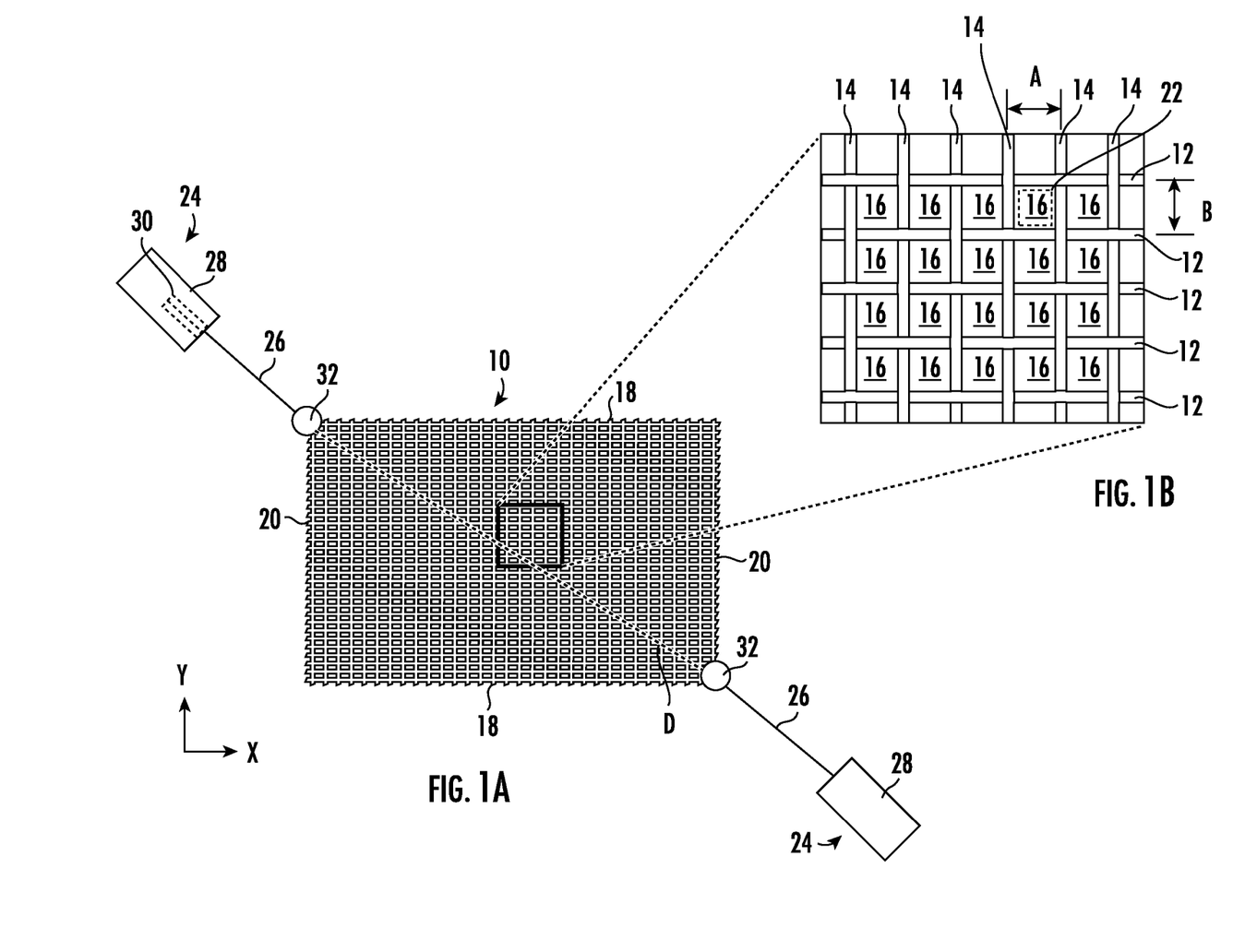
FIG. 1A is a view of a screen for an aeronautical gas turbine engine in a first arrangement.
FIG. 1B is a detailed view of the screen of FIG. 1A.

Referring now to the drawings, wherein identical numerals indicate the same elements throughout the figures, a screen 10 is shown in a first arrangement. The first arrangement as shown in FIGS. 1A-1B may be a "rectangular" arrangement such that a plurality of first filaments 12 and a plurality of second filaments 14 are arranged to form a substantially rectangular shape. In the rectangular arrangement, the screen 10 defines four corners and two sets of opposing parallel sides that form right angles at the corners. That is, the screen 10 includes two sides 18 arranged in the lateral direction X and two sides 20 arranged in the longitudinal direction Y. Alternatively, the screen 10 may be a different shape, such as a disk, an annulus, a torus, a triangle, a tetrahedron, or another polygonal shape.

As shown in FIGS. 1A-1B, the plurality of first filaments 12 are arranged in the lateral direction X, and the plurality of second filaments 14 are arranged in the longitudinal direction Y. The plurality of first filaments 12 are perpendicular to the plurality of second filaments 14 to form the rectangular shape of the first arrangement. The first and second filaments 12, 14 are thin pieces, such as wires, strips, or bars, of a suitable material, such as a metal or a composite material. The long, thin shape of the material allows the first and second filaments 12, 14 to slide past each other when the screen 10 is moved to a different arrangement. The first and second filaments 12, 14 may have substantially a same thickness, that is, a similar diameter or gauge in a cross-section. For example, the thickness of the first and second filaments 12, 14 may be from 0.5 to 3 millimeters (mm).

Each adjacent pair of the second filaments 14 defines a spacing therebetween, represented by the variable A. The spacing is a "lateral" spacing, i.e., a spacing in the lateral direction X. Each adjacent pair of first filaments 12 defines a spacing therebetween, represented by the variable B. The spacing is a "longitudinal" spacing, i.e., a spacing in the longitudinal direction Y. In this context, the spacing between adjacent first filaments 12 may be a "first spacing," and the spacing between adjacent second filaments 14 may be a "second spacing." In the embodiment of FIG. 1B, the spacings A, B between the first and second filaments 12, 14 are substantially the same throughout the screen 10, such that each pair of first filaments 12 has a same spacing A defined therebetween and each pair of second filaments 14 has a same spacing B defined therebetween. In another embodiment not shown in the FIGS., at least some of the first filaments 12 may have a different spacing A than others of the first filaments 12 or at least some of the second filaments 14 may have a different spacing B than others of the second filaments 14.

As shown in FIG. 1B, the plurality of first filaments 12 define a plurality of openings 16 with the plurality of second filaments 14. Each opening 16 has a boundary 22 defined by a pair of adjacent first filaments 12 and a pair of adjacent second filaments 14. In the example shown in FIG. 1B, the opening 16 is substantially rectangular, the pair of first filaments 12 defining two opposing sides in the lateral direction X and the pair of second filaments 14 defining two opposing sides in the longitudinal direction Y. The openings 16 are configured to allow air therethrough, e.g., into an inlet of an air duct as described below. The first filaments 12 are woven between the second filaments 14 to define the openings 16. By weaving the first filaments 12 between the second filaments 14, a sinusoidal shape of the weaved first and second filaments 12, 14 holds the first and second filaments 12, 14 against each other in a mesh.

Each of the plurality of openings 16 has a size that is based on the respective lateral spacing A and the respective longitudinal spacing B. In the example of FIG. 1B, the size may be an area defined by a multiplication of the lateral spacing and the longitudinal spacing, AB. In one example, the lateral spacing A may be substantially equal to the longitudinal spacing B such that the opening 16 has a substantially square shape. In another example, the lateral spacing A may be different to the longitudinal spacing B such that the opening 16 has a substantially rectangular shape. A ratio of the lateral spacing A to the longitudinal spacing B defines an opening aspect ratio, A/B, which may be in a range from 0.2 to 1.0. The lateral spacing A and the longitudinal spacing B may each be in a range from 0.5 mm to 100 mm. The lateral and longitudinal spacings A, B and the opening aspect ratio may be determined to allow a specific air flow through the screen 10 in the first arrangement.

An actuator 24 may be attached to the screen 10. In the example of FIGS. 1A-1B, the actuator 24 is a linear actuator. Alternatively, the actuator 24 may be a different kind of actuator 24, such as a rotary actuator. The actuator 24 includes a translator 26, such as a rod or a bar, and a driver 28, such as a motor or solenoid, that slides the translator 26 along a track 30. For clarity, only one of the tracks 30 is shown in the FIGS, and it is understood that each actuator 24 is similarly constructed in these examples. The translator 26 is attached to the screen 10 at an attachment point 32 by suitable fastener, such as an adhesive, a weld, or a friction fit. The actuator 24 may be fixed to another component, such as a wall, to allow the actuator 24 to move the screen 10 relative to that component.

The translator 26 is attached to the screen 10 in a manner that, when the driver 28 translates the translator 26 along the track 30, the screen 10 moves with the translator 26. That is, the actuator 24 is configured to apply a force to a portion of the screen 10, and the force pushes or pulls the first and second filaments 12, 14. Because the first and second filaments 12, 14 are woven to slide past each other, the first and second filaments 12, 14 are translated by application of the force. The force translates the screen 10 to a second arrangement, as described below, in which the plurality of first filaments 12 are arranged askew to the plurality of second filaments 14.

A plurality of actuators 24 may be attached to the screen 10 at respective attachment points 32, such as the two actuators 24 and two attachment points 32 shown in FIG. 1A. The attachment points 32 may be disposed proximate to the corners such that the forces applied by the actuators 24 are substantially along a diagonal line D connecting opposing corners. Alternatively, when the screen 10 is a rectangular shape, an actuator 24 may be attached to each of the four corners. Yet alternatively, when the screen 10 is a non-rectangular shape, actuators 24 may be attached at suitable locations to move the screen 10 to a specific arrangement.

Figures 2A, 2B:
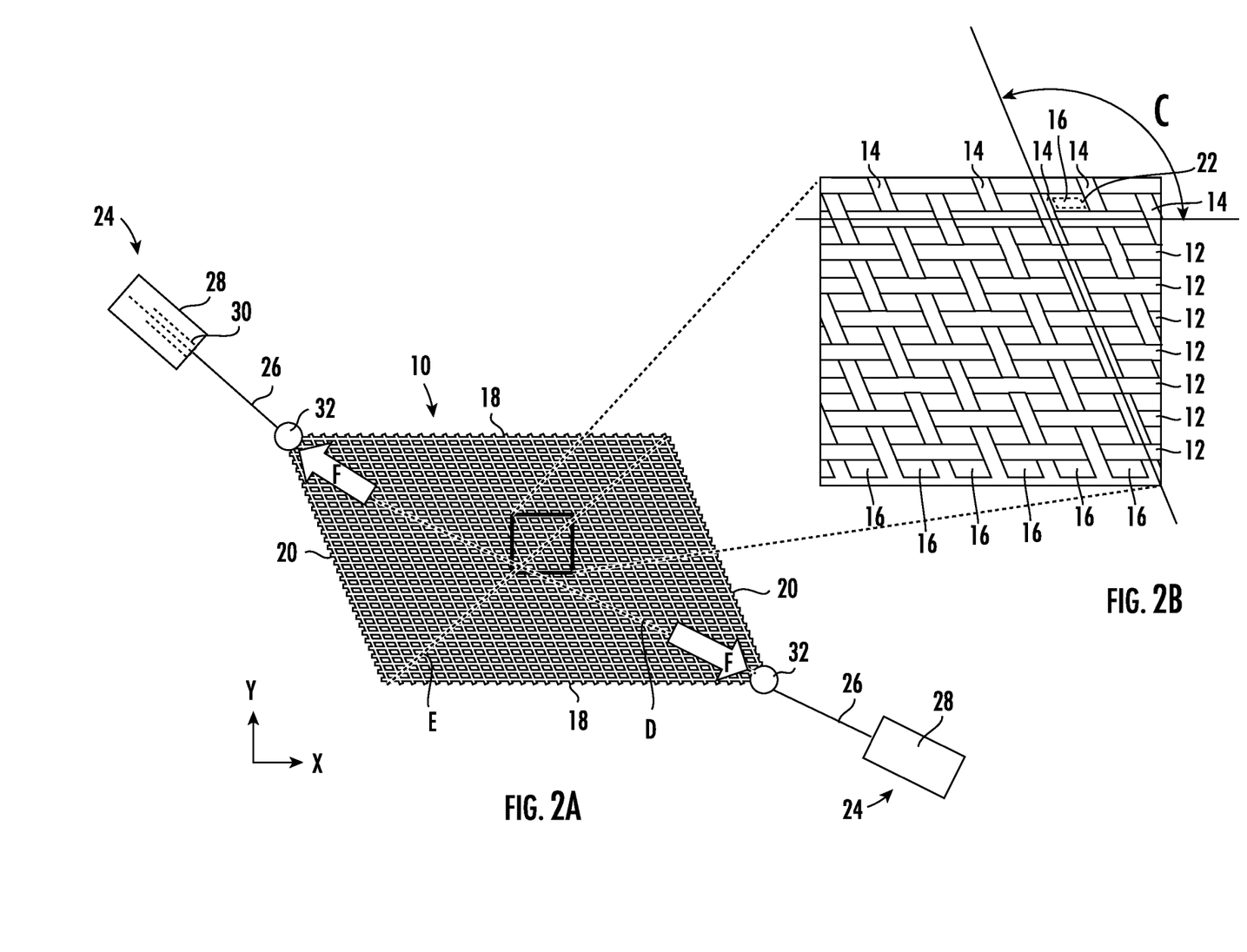
FIG. 2A is a view of the screen in a second arrangement.
FIG. 2B is a detailed view of the screen of FIG. 2A.

Now referring to FIGS. 2A-2B, a second arrangement of the screen 10 is shown. In this arrangement, the actuators 24 apply a force F to pull the screen 10 at the attachment points 32, translating at least some of the plurality of first filaments 12 and at least some of the plurality of second filaments 14. In this example, the opposing corners to which the actuators 24 are attached are moved away from each other, increasing a distance between the attachment points 32. As the opposing corners are pulled away from each other, the other two opposing corners are pushed toward each other. That is, the translation of the first and second filaments 12, 14 by the actuators 24 rotates the first and second filaments 12, 14 relative to the arrangement of FIG. 1. This rotation directs the first and second filaments 12, 14 along an axis (not shown) defined between the attachment points 32. Thus, more of the length of the first and second filaments 12, 14 aligns with the axis, and less of the length of the first and second filaments 12, 14 is arranged perpendicular to the axis. This results in the parallelogram shape of the screen 10 having a longer diagonal D aligned with the axis of the attachment points and a shorter diagonal E perpendicular to the axis of the attachment points 32. The specific lengths of the diagonals D, E depend on the aspect ratio of the screen 10, i.e., the ratio between the length and the width of the screen 10. In this example, the direction of the forces F aligns with the orientation of the actuators 24, which is angled relative to the diagonal D, and the actuators 24 may be arranged in a suitable position relative to the diagonal D in order to provide a specific direction for the forces F.

In the second arrangement, a size of at least one of the openings 16 changes to a second size. That is, the askew arrangement of the first and second filaments 12, 14 as described above decreases the area of the openings 16 relative to the perpendicular arrangement of the first and second filaments 12, 14, and thus the second size is less than the first size. The first size of the openings 16 in the first arrangement allows a specific airflow therethrough, and the second size of the openings 16 in the second arrangement allows a different airflow therethrough. Thus, by adjusting the size of the openings 16, airflow through the screen 10 may be controlled by the actuators 24.

Each of the plurality of openings 16 defines a skewness, represented with the variable C. In this context, as described above, the skewness is an angle defined between one of the first filaments 12 defining the boundary 22 of the respective opening 16 and one of the second filaments 14 defining the boundary 22 of the respective opening 16. In FIG. 1B, the skewness of each of the plurality of openings 16 is 90 degrees, and each opening 16 is substantially rectangular. In FIG. 2B, the skewness of each of the plurality of openings 16 is different than 90 degrees, and each opening 16 is shaped as a parallelogram. Specifically, FIG. 2B shows a skewness greater than 90 degrees, i.e., an obtuse skewness. The skewness may be a value from, e.g., 20 to 160 degrees. The size of each opening 16 can be determined based on the spacings A, B, and the skewness C: AB sin(C). Because the sine of 90 degrees is 1, the expression for the size of the opening 16 results in the value AB for the size of the rectangular opening 16, which is the same as described above. When the skewness of the openings 16 is different than 90 degrees, the arrangement is a "slanted" arrangement.

Figure 3:
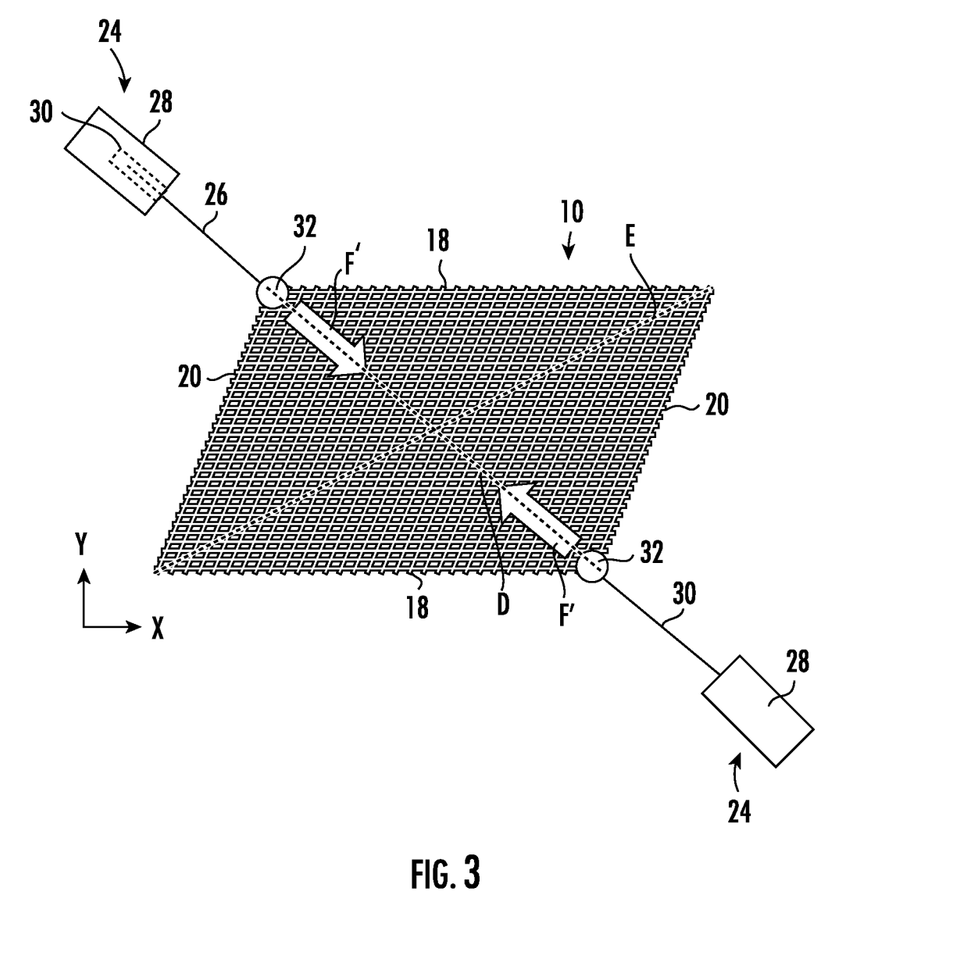
FIG. 3 is a view of the screen in a third arrangement.

Now referring to FIG. 3, the actuators 24 move the screen 10 to a third arrangement. The actuators 24 apply a force F' to push the attachment points 32 toward each other, and this third arrangement is another askew arrangement. In this example, the opposing corners to which the actuators 24 are attached are moved toward each other, decreasing the distance between the attachment points 32. That is, the distance along the diagonal D is less than the distance along the diagonal E. In the third arrangement, the skewness of the openings is less than 90 degrees, i.e., an acute skewness. Because the first filaments 12 are askew to the second filaments 14, the openings 16 are again substantially shaped as parallelograms, similar to the openings 16 in the second arrangement.

The actuators 24 may move the screen 10 between the different arrangements of FIGS. 1A-3 by translating the translators 26 back and forth along their respective tracks 30. That is, the actuators 24 may vibrate the screen 10 between the first, second, and third arrangements, or between different arrangements. The movement of the first and second filaments 12, 14 during vibration of the screen 10 may remove contaminants, such as ice and dirt, that may accumulate on the screen 10 and block one or more of the openings 16. Removing the contaminants by vibrating the screen 10, sometimes referred to as a "de-icing" process, provides more consistent airflow through the screen 10 because the openings 16 are no longer blocked by the contaminants.

Figure 4:
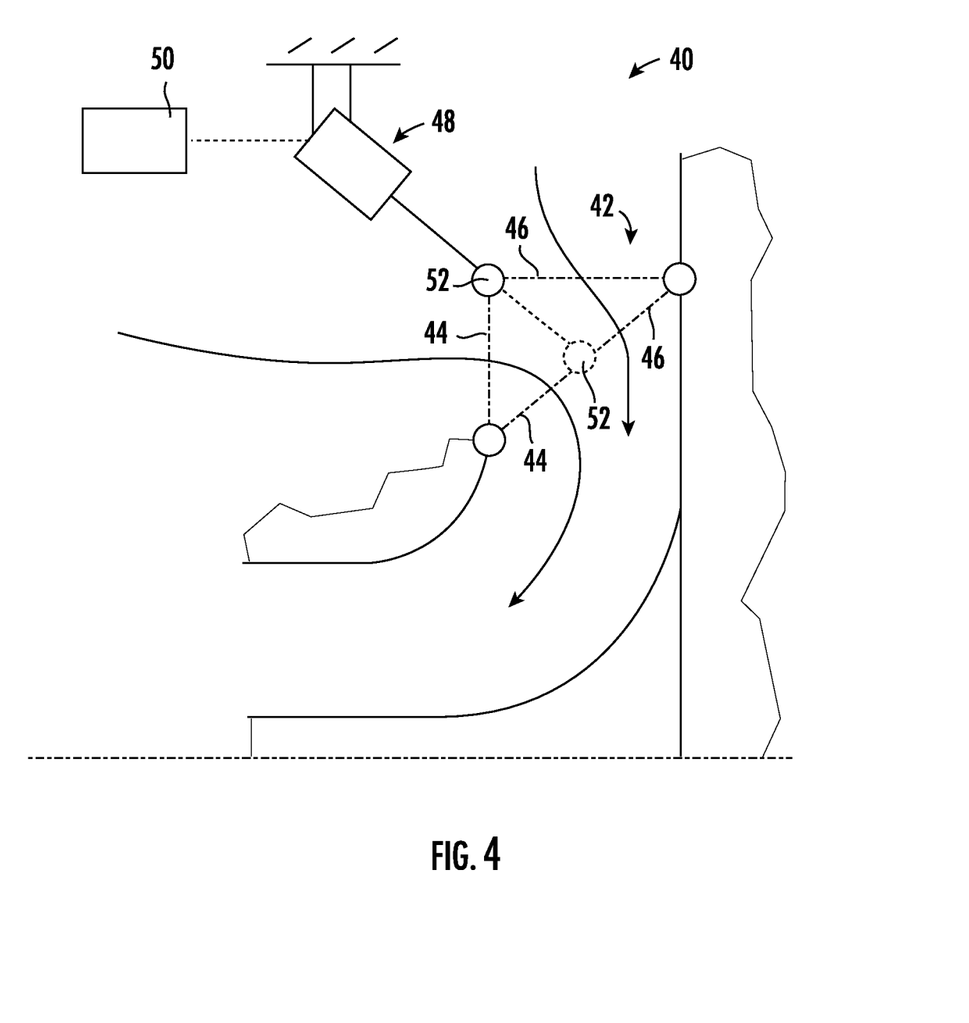
FIG. 4 is a side view of an air inlet assembly for an aeronautical gas turbine engine.

With reference to FIG. 4, an air duct assembly 40 for a gas turbine engine of an aircraft is shown. The gas turbine engine is more specifically a turboprop engine, such as a reverse flow turboprop engine.

The air duct assembly 40 provides air from outside the aircraft to the gas turbine engine. The air duct assembly 40 includes an air inlet 42, a first screen 44, a second screen 46, an actuator 48, and a controller 50. The air inlet 42 is an annular opening that allows air to flow to the gas turbine engine. The first and second screens 44, 46 are constructed similarly to the screen 10 described above, including respective first and second filaments (not shown in FIG. 4). The first and second screens 44, 46 are attached to the air inlet 42 and extend circumferentially around the air inlet 42. The actuator 48 includes the translator, driver, and track as described above, and are not shown in FIG. 4 for clarity.

The air duct assembly 40 controls air flow through the air inlet 42 by actuating the controller 50 to move the first and second screens 44, 46 from respective first arrangements, shown with the actuator 48 in solid lines, to respective second arrangements, shown with the actuator 48 in dashed lines. In the second arrangements, as described above, the sizes of respective openings of the first and second screens 44, 46 are adjusted, allowing a specified air flow through the first and second screens 44, 46. Specifically, in the second arrangements, the first and second screens 44, 46 may be configured to reduce air flow through the air inlet 42 relative to a default air flow, the default air flow being defined as the air flow when the first and second screens 44, 46 are in the first arrangement. Additionally, the first and second screens 44, 46 straighten the air flow by forcing the air through the openings. The openings inhibit higher pressure air flow and allow lower pressure air flow, which results in a more uniform air flow past the first and second screens 44, 46 than the airflow outside of the first and second screens 44, 46.

The controller 50 includes a processor and a memory, and the memory includes instructions executable by the process. Specifically, the controller 50 is in communication with the actuator 48, such as a wired or wireless connection, to provide instructions to the actuator 48. The controller 50 is configured to provide instructions to actuate the actuator 48 to translate one or more of the first or second screens 44, 46 to the respective second arrangement, thereby adjusting air flow through the air inlet 42. That is, upon receiving instructions from the controller 50, the actuator 48 moves the translator to a specified position, thereby moving the first and second screens 44, 46 to which the translator is attached to the second arrangement. The controller 50 of FIG. 4 is shown near the actuator for clarity, and it is understood that the controller 50 would be disposed in a suitable location in the aircraft.

In the exemplary air duct assembly 40 of FIG. 4, one actuator 48 is shown. The actuator 48 is fixed outside of the air inlet 42 and translates the first and second screens 44, 46. In one example, the actuator 48 translates the first and second screens 44, 46 away from the actuator 48 toward the air inlet 42 and into the second arrangement. In another example, the actuator 48 translates the first and second screens 44, 46 circumferentially into the second arrangement. Fixing the actuator 48 outside the air inlet 42 allows air to flow through the air inlet 42 unimpeded by the actuator 48. Alternatively, the actuator 48 may be disposed in the air inlet 42 (not shown) and may pull the first and second screens 44, 46 toward the actuator 48 into the air inlet 42. Disposing the actuator 48 in the air inlet 42 allows the actuator 48 to be positioned closer to the first and second screens 44, 46 than when the actuator 48 is disposed outside the air inlet 42. Yet alternatively, the air duct assembly 40 may include a plurality of actuators 48, each actuator 48 in communication with the controller 50 to translate one or more of the first or second screens 44, 46 to the second arrangement. The plurality of actuators 48 may be disposed circumferentially around the air inlet 42.

The first and second screens 44, 46 meet at a junction 52, i.e., a point at which the first screen 44 contacts the second screen 46. In the exemplary air duct assembly of FIG. 4, the junction 52 is the common edge of the first and second screens 44, 46, and the junction 52 extends around the annular air inlet 42. The actuator 48 is attached to the first and second screens 44, 46 at the junction 52. When the controller 50 actuates the actuator 48, the translator applies a force and moves the junction 52, thereby translating both the first and second screens 44, 46 to their respective second arrangements.

Alternatively, not shown in the FIGS., the air duct assembly 40 may include a single screen that extends over the air inlet 42. The single screen may have a suitable shape, such as an arcuate shape, such that no junction is present. The actuator 48 is attached to the single screen at a suitable attachment point, moving the screen to the second arrangement upon instruction by the controller 50. Yet alternatively, the air duct assembly 40 may include a plurality of screens in suitable shapes to control air flow through the air inlet 42.

In addition to the air duct assembly 40 shown in the FIGS., a screen such as the screen 10 or first and second screens 44, or 46 may be used in other applications. In one example, the screen may be incorporated into a heat exchanger system across a heat exchanger duct to avoid oil overcooling. In such a form, the screen may be actuated to limit cooling air flow, maintaining a minimum temperature for the oil. In another example, the screen may be incorporated into a fluid system to assist or replace a valve. In such a form, one of the arrangements may allow a certain fluid flow through the screen, and when the screen in moved to a different arrangement, the smaller size of the openings may slow or stop fluid flow therethrough. Thus, the screen acts similarly to a valve, selectively providing a specified fluid flow.

Further aspects are provided by the subject matter of the following clauses:

A screen for an aeronautical gas turbine engine includes a plurality of first filaments, each of the first filaments arranged in a lateral direction and arranged parallel to the others of the first filaments and a plurality of second filaments, each of the second filaments arranged in a longitudinal direction and arranged parallel to the others of the second filaments, the plurality of second filaments defining a plurality of openings with the plurality of first filaments, wherein the plurality of first filaments and the plurality of second filaments define a first arrangement in which the plurality of first filaments are perpendicular to the plurality of second filaments, and wherein, upon application of a force to the screen, at least some of the plurality of first filaments and at least some of the plurality of second filaments are configured to translate from the first arrangement to a second arrangement in which a size of at least one of the openings is configured to change from a first size to a second size.

The screen of any one or more of the clauses herein, wherein the second size of the at least one of the openings is smaller than the first size of the at least one of the openings.

The screen of any one or more of the clauses herein, wherein each of the plurality of openings defines a skewness that is an angle defined between one of the first filaments defining a boundary of the respective opening and one of the second filaments defining the boundary of the respective opening, the skewness of each of the plurality of openings in the first arrangement is 90 degrees, and the skewness of each of the plurality of openings in the second arrangement is different than 90 degrees.

The screen of any one or more of the clauses herein, wherein each of the first filaments is woven through each of the second filaments to define the plurality of openings.

The screen of any one or more of the clauses herein, wherein each adjacent pair of first filaments defines a first spacing therebetween, and each adjacent pair of the second filaments defines a second spacing therebetween, and a size of each of the plurality of openings is based on the respective first spacing between the pair of first filaments defining the boundary of the opening and the respective second spacing between the pair of second filaments defining the boundary of the opening.

The screen of any one or more of the clauses herein, wherein the respective first spacing of at least one of the plurality of openings is different than the respective second spacing of the at least one of the plurality of openings.

The screen of any one or more of the clauses herein, wherein the respective first spacing of at least one of the plurality of openings is substantially equal to the respective second spacing of the at least one of the plurality of openings The screen of any one or more of the clauses herein, wherein a ratio of the respective first spacing of the opening to the respective second spacing of the opening defines an opening aspect ratio.

The screen of any one or more of the clauses herein, wherein the opening aspect ratio is in a range from 0.2 to 1.0.

The screen of any one or more of the clauses herein, wherein the first spacing and the second spacing are each in a range from 0.5 mm to 100 mm.

The screen of any one or more of the clauses herein, wherein, upon application of a second force to the screen, at least some of the plurality of first filaments and at least some of the plurality of second filaments are configured to translate from the first arrangement to a third arrangement in which a size of at least one of the openings is configured to change from a first size to a third size.

An assembly includes a screen comprising a plurality of first filaments and a plurality of second filaments, the plurality of first filaments arranged perpendicular to the plurality of second filaments to define a first arrangement including a plurality of openings defined between the first filaments and the second filaments, and an actuator attached to the screen and configured to move a portion of the screen to translate the screen to a second arrangement in which the plurality of first filaments are arranged askew to the plurality of second filaments, wherein a respective size of each of the plurality of openings in the second arrangement differs from a respective first size of each of the plurality of openings in the first arrangement.

The assembly of any one or more of the clauses herein, wherein the actuator is configured to vibrate the screen between the first arrangement and the second arrangement.

The assembly of any one or more of the clauses herein, wherein each opening defines a skewness that is an angle defined between one of the first filaments defining a boundary of the opening and one of the second filaments defining the boundary of the opening, the skewness of each opening in the first arrangement is 90 degrees, and the skewness of each opening in the second arrangement is different than 90 degrees.

The assembly of any one or more of the clauses herein, wherein the respective size of the plurality of openings in the second arrangement is smaller than the respective first size of the plurality of openings in the first arrangement.

The assembly of any one or more of the clauses herein, wherein the actuator is attached to the screen at an attachment point.

The assembly of any one or more of the clauses herein, further including a plurality of actuators, each of the plurality of actuators attached to the screen at a respective attachment point.

The assembly of any one or more of the clauses herein, wherein the respective attachment point for each of the plurality of actuators is determined based on a shape of the screen.

An air duct assembly for a turbine engine, the air duct assembly comprising an air inlet; a screen extending across the air inlet, the screen comprising plurality of first filaments arranged in a lateral direction parallel to each other of the first filaments, and a plurality of second filaments in a longitudinal direction parallel to each other of the second filaments, the plurality of second filaments defining a plurality of openings with the plurality of first filaments, wherein the plurality of first filaments and the plurality of second filaments define a first arrangement in which the plurality of first filaments are perpendicular to the plurality of second filaments; and an actuator attached to the screen and configured to translate the screen from the first arrangement to a second arrangement in which the plurality of first filaments are arranged askew to the plurality of second filaments, wherein, in the second arrangement, respective sizes of the plurality of openings are smaller than respective first sizes of the plurality of openings in the first arrangement, and wherein, in the second arrangement, the screen is configured to reduce air flow through the air inlet relative to a default air flow through the air inlet.

The air duct assembly of any one or more of the clauses herein, further comprising a controller configured to actuate the actuator to translate the screen to the second arrangement to provide a specified air flow through the air inlet.

The air duct assembly of any one or more of the clauses herein, wherein the controller is configured to actuate the actuator to vibrate the screen between the first arrangement and the second arrangement.

The air duct assembly of any one or more of the clauses herein, further comprising a second actuator attached to the screen, wherein the controller is configured to actuate the actuator and the second actuator to translate the screen to the second arrangement.

The air duct assembly of any one or more of the clauses herein, further comprising a second screen attached to screen to define a junction.

The air duct assembly of any one or more of the clauses herein, wherein the actuator is attached to the screen and the second screen at the junction, and the actuator is configured to translate the screen and the second screen to respective second arrangements upon application of a force on the screen and the second screen at the junction.

A method for moving a screen of a gas turbine engine, the screen including a plurality of first filaments and a plurality of second filaments, the plurality of first filaments defining a plurality of openings with the plurality of second filaments, the method comprising actuating an actuator to apply a force to the screen, translating the screen from a first arrangement to a second arrangement in which a size of at least one of the openings is configured to change from a first size to a second size.

The method of any one of more of the clauses herein, further comprising removing ice or debris from the screen upon translating the screen to the second arrangement.

The method of any one of more of the clauses herein, further comprising translating the screen from the first arrangement to a third arrangement in which the size of at least one of the openings is configured to change from the first size to a third size.

The method of any one of more of the clauses herein, further comprising actuating the actuator to vibrate the screen between the first arrangement and the second arrangement.

The method of any one of more of the clauses herein, further comprising reducing air flow through the screen when the screen is in the second arrangement.

The method of any one of more of the clauses herein, further comprising a plurality of actuators to apply the force to the screen.

The method of any one of more of the clauses herein, wherein the second size of at least one of the openings is smaller than the first size of the at least one of the openings.

The method of any one or more of the clauses herein, wherein each of the plurality of openings defines a skewness that is an angle defined between one of the first filaments defining a boundary of the respective opening and one of the second filaments defining the boundary of the respective opening, the skewness of each of the plurality of openings in the first arrangement is 90 degrees, and the skewness of each of the plurality of openings in the second arrangement is different than 90 degrees.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A screen for an air inlet of an aeronautical gas turbine engine, the screen comprising:
    a plurality of first filaments, each of the plurality of first filaments arranged in a lateral direction and arranged parallel to others of the plurality of first filaments;
    a plurality of second filaments, each of the plurality of second filaments arranged in a longitudinal direction and arranged parallel to the others of the plurality of second filaments, the plurality of second filaments defining a plurality of openings with the plurality of first filaments; and
    an actuator attached to the screen,
    wherein the plurality of first filaments and the plurality of second filaments define a first arrangement in which the plurality of first filaments are perpendicular to the plurality of second filaments, wherein in the first arrangement the plurality of first filaments and the plurality of second filaments define a screen plane, and
    wherein, upon application of a force to the screen via the actuator, at least some of the plurality of first filaments and at least some of the plurality of second filaments are configured to translate within the screen plane from the first arrangement to a second arrangement in which a size of at least one of the openings is configured to change from a first size to a second size.

2. The screen of claim 1, wherein the second size of the at least one of the openings is smaller than the first size of the at least one of the openings.

3. The screen of claim 1, wherein each of the plurality of openings defines a skewness that is an angle defined between one of the first filaments defining a boundary of a respective opening and one of the second filaments defining the boundary of the respective opening, the skewness of each of the plurality of openings in the first arrangement is 90 degrees, and the skewness of each of the plurality of openings in the second arrangement is different than 90 degrees.

4. The screen of claim 1, wherein each of the plurality of first filaments is woven between each of the plurality of second filaments to define the plurality of openings, and wherein the plurality of first filaments and the plurality of second filaments are metal.

5. The screen of claim 1, wherein each adjacent pair of the plurality of first filaments defines a pair of first filaments having a first spacing therebetween, and each adjacent pair of the plurality of second filaments defines a pair of second filaments having a second spacing therebetween, and a size of each of the plurality of openings is based on the respective first spacing between the pair of first filaments defining a boundary of the opening and the respective second spacing between the pair of second filaments defining the boundary of the opening.

6. The screen of claim 5, wherein the respective first spacing of at least one of the plurality of openings is different than the respective second spacing of the at least one of the plurality of openings.

7. The screen of claim 5, wherein the respective first spacing of at least one of the plurality of openings is equal to the respective second spacing of the at least one of the plurality of openings.

8. The screen of claim 5, wherein a ratio of the respective first spacing of the opening to the respective second spacing of the opening defines an opening aspect ratio.

9. The screen of claim 8, wherein the opening aspect ratio is in a range from 0.2 to 1.0.

10. The screen of claim 5, wherein the first spacing and the second spacing are each in a range from 0.5 mm to 100 mm.

11. An assembly comprising:
an air inlet of a turbine engine;
a screen extending across the air inlet and comprising a plurality of first filaments and a plurality of second filaments, the plurality of first filaments arranged perpendicular to the plurality of second filaments to define a first arrangement including a plurality of openings defined between the plurality of first filaments and the plurality of second filaments, wherein in the first arrangement the plurality of first filaments and the plurality of second filaments define a screen plane; and
an actuator attached to the screen and configured to move a portion of the screen to translate the screen within the screen plane to a second arrangement in which the plurality of first filaments are arranged askew to the plurality of second filaments,
wherein a respective second size of each of the plurality of openings in the second arrangement differs from a respective first size of each of the plurality of openings in the first arrangement.

12. The assembly of claim 11, wherein the actuator is configured to vibrate the screen between the first arrangement and the second arrangement.

13. The assembly of claim 11, wherein each opening of the plurality of openings defines a skewness that is an angle defined between one of the plurality of first filaments defining a boundary of the opening and one of the plurality of second filaments defining the boundary of the opening, the skewness of each opening in the first arrangement is 90 degrees, and the skewness of each opening in the second arrangement is different than 90 degrees.

14. The assembly of claim 11, wherein the respective second size of the plurality of openings in the second arrangement is smaller than the respective first size of the plurality of openings in the first arrangement.

15. An air duct assembly for a turbine engine, the air duct assembly comprising:
an air inlet;
a screen extending across the air inlet, the screen comprising:
a plurality of first filaments arranged in a lateral direction parallel to each other filament of the plurality of first filaments; and
a plurality of second filaments in a longitudinal direction parallel to each other filament of the plurality of second filaments, the plurality of second filaments defining a plurality of openings with the plurality of first filaments,
wherein the plurality of first filaments and the plurality of second filaments define a first arrangement in which the plurality of first filaments are perpendicular to the plurality of second filaments, wherein in the first arrangement the plurality of first filaments and the plurality of second filaments define a screen plane, and
an actuator attached to the screen and configured to translate the screen within the screen plane from the first arrangement to a second arrangement in which the plurality of first filaments are arranged askew to the plurality of second filaments,
wherein, in the second arrangement, respective second sizes of the plurality of openings are smaller than respective first sizes of the plurality of openings in the first arrangement, and
wherein, in the second arrangement, the screen is configured to reduce air flow through the air inlet relative to a default air flow through the air inlet.

16. The air duct assembly of claim 15, further comprising a controller configured to actuate the actuator to translate the screen to the second arrangement to provide a specified air flow through the air inlet.

17. The air duct assembly of claim 16, wherein the controller is configured to actuate the actuator to vibrate the screen between the first arrangement and the second arrangement.

18. The air duct assembly of claim 16, further comprising a second actuator attached to the screen, wherein the controller is configured to actuate the actuator and the second actuator to translate the screen to the second arrangement.

19. The air duct assembly of claim 15, further comprising a second screen attached to the screen to define a junction.

20. The air duct assembly of claim 19, wherein the actuator is attached to the screen and the second screen at the junction, and the actuator is configured to translate the screen and the second screen to respective second arrangements upon application of a force on the screen and the second screen at the junction.

* * * * *